(12) United States Patent
Maze et al.

(10) Patent No.: US 8,463,936 B2
(45) Date of Patent: Jun. 11, 2013

(54) METHOD AND DEVICE FOR DISTRIBUTING DIGITAL DATA IN PARTICULAR FOR A PEER-TO-PEER NETWORK

(75) Inventors: Frédéric Maze, Langan (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 11/119,696

(22) Filed: May 3, 2005

(65) Prior Publication Data

US 2005/0278389 A1    Dec. 15, 2005

(30) Foreign Application Priority Data

May 7, 2004  (FR) ...................................... 04 04953

(51) Int. Cl.
*G06F 15/173*    (2006.01)

(52) U.S. Cl.
USPC ............................ 709/238; 709/239; 709/240

(58) Field of Classification Search
None
See application file for complete search history.

(56) References Cited

U.S. PATENT DOCUMENTS

| | | | | |
|---|---|---|---|---|
| 5,349,682 A | * | 9/1994 | Rosenberry .................... | 718/102 |
| 5,452,448 A | * | 9/1995 | Sakuraba et al. ............ | 707/201 |
| 5,483,652 A | * | 1/1996 | Sudama et al. ................. | 707/10 |
| 5,513,314 A | * | 4/1996 | Kandasamy et al. ............ | 714/6 |
| 5,581,753 A | * | 12/1996 | Terry et al. .................... | 707/201 |
| 5,734,898 A | * | 3/1998 | He ............................... | 707/203 |
| 5,742,792 A | * | 4/1998 | Yanai et al. ................... | 711/162 |
| 5,867,494 A | * | 2/1999 | Krishnaswamy et al. .... | 370/352 |
| 6,065,062 A | * | 5/2000 | Periasamy et al. ............ | 709/242 |
| 6,112,249 A | * | 8/2000 | Bader et al. .................... | 709/239 |
| 6,484,204 B1 | | 11/2002 | Rabinovich .................... | 709/226 |

(Continued)

FOREIGN PATENT DOCUMENTS

| | | |
|---|---|---|
| GB | 2 385 683 | 8/2003 |
| WO | WO 01/93064 | 12/2001 |
| WO | WO 02/095605 | 11/2002 |

OTHER PUBLICATIONS

Q. Lv, et al., "Search and Replication in Unstructured Peer-to-Peer Networks", ACM International Conference on Super Computing, Jun. 2002.

(Continued)

*Primary Examiner* — Mariela Reyes
(74) *Attorney, Agent, or Firm* — Fitzpatrick, Cella, Harper & Scinto

(57) ABSTRACT

A method of distributing digital data implemented in a telecommunications system that has at least one holding server device able to hold digital data and to receive at least one request for supplying said digital data, at least one client device able to request the digital data of the holding server device, and at least one replication server device able to store a replica of the digital data of the holding server device and to supply the replica digital data to the client device. The method, which is executed after the reception by the holding server device of a request to obtain digital data coming from the client device, selects, on the basis of predetermined information relating to the server devices and/or client devices, from among the holding server device and the at least one replication server device, a server device for supplying the digital data to the client device, and in a case where a replication server device is selected, creating a replica of the requested digital data in the selected replication server device, and redirecting the client device to the selected replication server device for obtaining the digital data.

19 Claims, 8 Drawing Sheets

U.S. PATENT DOCUMENTS

| | | | |
|---|---|---|---|
| 6,622,157 B1 * | 9/2003 | Heddaya et al. | 709/202 |
| 6,928,469 B1 * | 8/2005 | Duursma et al. | 709/223 |
| 7,403,980 B2 * | 7/2008 | Stringer-Calvert et al. | 709/220 |
| 7,783,777 B1 * | 8/2010 | Pabla et al. | 709/238 |
| 2002/0049842 A1 * | 4/2002 | Huetsch et al. | 709/225 |
| 2003/0204605 A1 * | 10/2003 | Hudson et al. | 709/228 |
| 2004/0184478 A1 | 9/2004 | Donescu et al. | 709/204 |
| 2005/0044146 A1 | 2/2005 | Nassor et al. | 709/205 |
| 2005/0044483 A1 | 2/2005 | Maze et al. | 715/501.1 |
| 2005/0114386 A1 | 5/2005 | Nassor et al. | 707/102 |
| 2005/0198118 A1 | 9/2005 | Viger et al. | 709/203 |
| 2005/0228753 A1 | 10/2005 | Viger et al. | 726/3 |

OTHER PUBLICATIONS

U.S. Appl. No. 11/434,168, filed May 16, 2006.

U.S. Appl. No. 10/576,953, filed Apr. 24, 2006.

* cited by examiner

Fig. 7A

| UUID identifier of digital data | Address of server | Access path | Size of digital data | Date of last access |
|---|---|---|---|---|
| 1221a571-37b8-734c-98e2-c6381fb71739 | @ Server 15 | /storage | 1,256 Kb | 30-Dec-2003 18:56:21 |
| 5689e123-a9b1-e5d0-98a3-c7159aff3429 | @ Server 14 | /image | 600 Kb | 29-Dec-2003 08:12:52 |
| 323cba78-b473-8d46-8ad7-5ce4e65901ea | @ Server 13 | (not given) | 513 Kb | 30-Dec-2003 12:59:01 |

71

| Address of server | Maximum storage space $ES_{MAX}$ | Storage space used $ES_U$ | Type de server | Type of connection | Mean duration of connection | Connected |
|---|---|---|---|---|---|---|
| @ Server 15 | 10,000 Kb | 1,856 Kb | web (login/password) | direct | max. | yes (IP address) |
| @ Server 13 | 5,000 Kb | (not given) | proxy | 1024 ADSL | 20% | no |

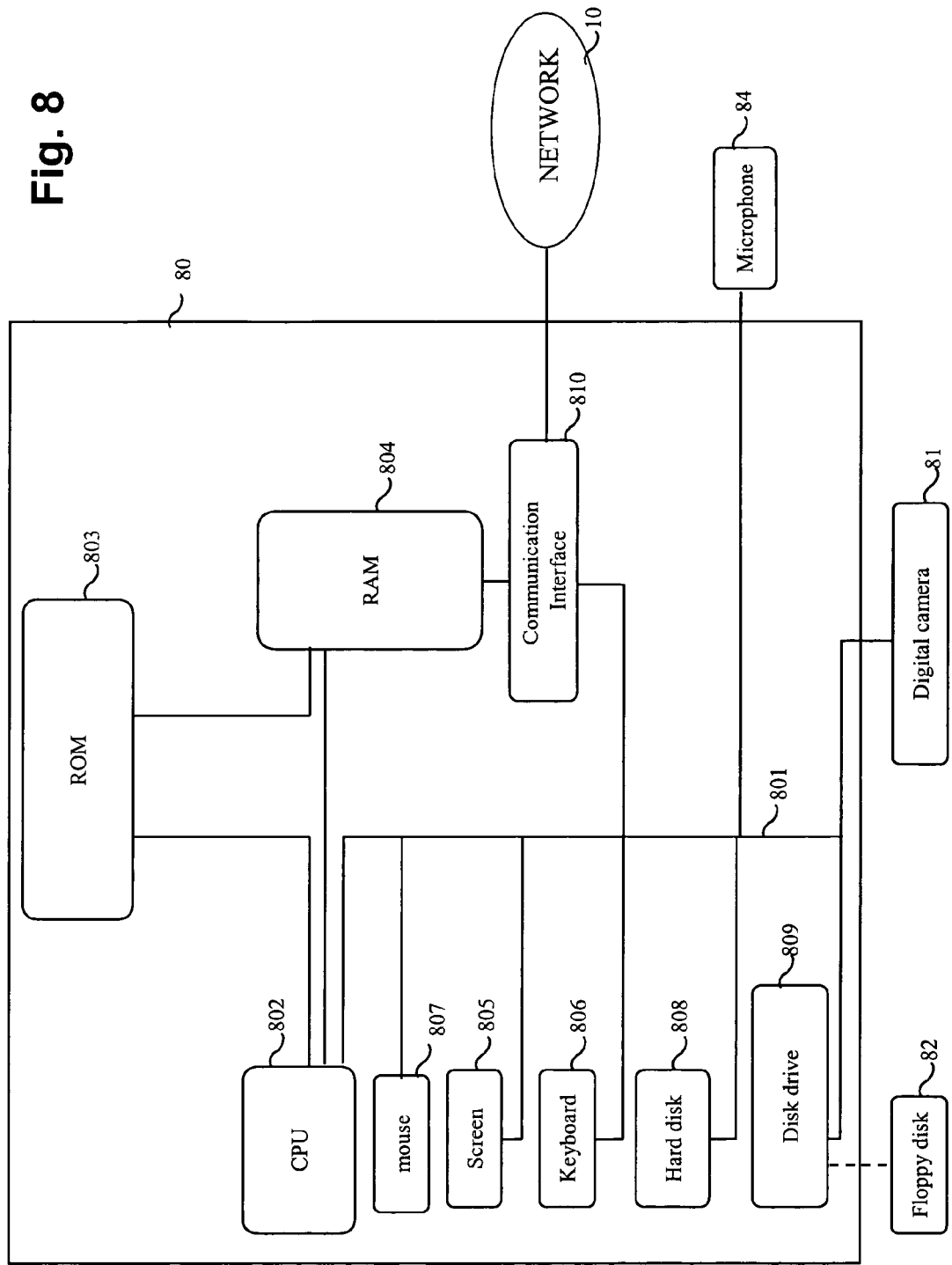

METHOD AND DEVICE FOR DISTRIBUTING DIGITAL DATA IN PARTICULAR FOR A PEER-TO-PEER NETWORK

FIELD OF THE INVENTION

The present invention concerns in general terms the distribution of digital data through a telecommunications network. More particularly, the present invention concerns a method and device for distributing digital data with possible replication of the digital data allowing increased accessibility and availability thereof.

The invention finds a favored, but not exclusive, application in telecommunications systems of the peer-to-peer or P2P type, in particular for sharing digital data, such as the P2P systems implemented on top of the Internet.

BACKGROUND OF THE INVENTION

In P2P systems, each machine connected to the telecommunications network can behave both as a client and as a server. First the digital data received by a machine as a client machine can then for example be served by this machine to other machines in the telecommunications network. Because the shared digital data are kept on the client machines, P2P systems considerably reduce the infrastructure costs compared with centralized systems of the client/server type. This is because P2P systems allow a distribution of the requirements in terms of storage capacity and bandwidth of the network between all the machines connected to the telecommunications network.

A particular difficulty with P2P systems lies in their topology, which is very unstable. This is because, in these P2P systems, the machines can be connected or disconnected at any time. When a machine is disconnected, the data which it is able to supply to a client are then unavailable. The client must then await a subsequent connection of the disconnected machine in order to have access to the digital data requested. In addition, the IP addresses of the machines are unpredictable and liable to be different at each connection.

The accessibility and availability of the data therefore constitute in P2P systems particularly tricky problems for which it would be desirable to offer solutions.

The replication of the data in several servers is a known technique which is used for improving the accessibility and availability of the data in a network.

There is known, through the document WO-02/095605 (IBM), a system for the automatic deployment/redeployment of web services between various sites in a telecommunications network.

In this deployment system, the conditions of use of the web services are monitored and analyzed by a central authority which decides, when it deems it necessary for the efficacy of the services, to trigger a dynamic deployment of the services at various locations in the telecommunications network. The requests from the clients for the services deployed are then redirected automatically to the new locations of these services.

There is also known, through the document U.S. Pat. No. 6,484,204 (AT&T), a system for redirecting requests and managing replicas of objects in which requests for an object sent to an original server are redirected towards replicas of this object on another machine in the network.

In accordance with this AT&T system, the number of redirections of a request to an object replica in question and a distance representing a communication cost as far as each of the servers of the object replica are calculated by a distributing device. When the distributing device receives a request, it determines a server for processing the request from the information calculated. The request is then transmitted to the server selected or, in a variant, it is the requester who is redirected to the server selected.

According to the AT&T system, each machine storing an object replica is free to destroy it, to make it migrate or to replicate it autonomously. In order to decide on the conduct to be followed, the machine compares the number of requests for the object replica with various threshold values. However, the deployment decision, that is to say the decision to replicate on other machines objects held by original servers, belongs in the AT&T system solely to a central authority which is responsible for best managing the object replicas in the network.

These IBM and AT&T systems in the prior art appear to be more particularly designed for networks of the client/server or at least of the centralized type.

Because of the need for a central authority for the deployment decision, the IBM and AT&T systems described above are ill-adapted to an implementation in P2P network architectures of the non-centralized type such as Gnutella.

Deployment decisions taken at each of the servers lend themselves better to use in the various existing P2P network architectures, whether these be centralized, decentralized or hybrid.

Another drawback in particular of the IBM system lies in the fact that the deployment decision is made a posteriori, that is to say after the data concerned have been transferred at least once by the original server. This aspect is detrimental for machines with a low data transfer capacity since, in the best of cases, that is to say if the deployment decision takes place after a first data transfer, these machines will have to transmit the data at least one more time, to a replication server.

The article "*Search and Replication in Unstructured Peer-to-Peer Networks*" by Qin Lv et al., in *ACM International Conference on Supercomputing*, June 2002, describes distributed replication strategies in the context of decentralized and non-structured P2P networks such as Gnutella.

The concept of proactive replication of objects in a P2P network is introduced in this article. In accordance with this proactive replication concept, an object can be replicated on a machine without any request having been made by the latter for the object concerned. In this way the search success rate is improved during a search for this object on the P2P network, whilst also improving the availability of the object.

Two replication strategies are presented for the purpose of improving the search success rates. Namely:
  a path replication which consists of replicating the object along the path between the requester and the server, and
  a random replication which consists of replicating the same number of objects as for the replication above but in which the objects are placed randomly between the sites examined.

These replication strategies are optimized in order to improve the object search success rate and do not take into account for example parameters related to the data transfer capacities of the machines.

Replication solutions allowing a lesser demand in terms of data transfer of the machines having low transfer capacities and adaptable to various network architectures, including P2P architectures, would constitute a significant advance in this area of the technique.

SUMMARY OF THE INVENTION

The present invention aims firstly to provide a digital data distribution method capable of providing any replication of digital data in order to improve their accessibility and availability and not having the drawbacks disclosed above.

A method of distributing digital data according to the invention implemented in a telecommunications system comprising at least one server device able to hold digital data and to receive at least one request for supplying the digital data, at least one client device able to request the digital data of the holding server device and at least one replication server device able to store a replica of the digital data of the holding server device and to supply the digital data replica to the client device, comprises the following step, executed at the time of reception by a holding server device of a request to obtain digital data coming from a client device, of:

creating, in the holding server device, on the basis of predetermined information relating to the server and/or clients devices, a replica of the requested digital data in said at least one replication server device after the reception of the request for an indirect supply by a replication server device.

Correspondingly, the invention also concerns a digital data distribution device incorporated in a distributed manner in a telecommunications system comprising at least one server device able to hold digital data and receive at least one request for supplying the digital data, at least one client device able to request the digital data of the holding server device and at least one replication server device able to store a replica of the digital data of the holding server device and to supply the digital data replica to the client device, comprising creation means, incorporated in at least one holding server device and activated at the time of reception by a holding server device of a request to obtain digital data, in order to create a replica of the requested digital data in said at least one replication server device after the reception of the request for an indirect supply by a replication server device, the creation being taken on the basis of predetermined information relating to the server and/or client devices.

The invention is particularly well suited to an application in a telecommunications system supporting communications of the P2P type. In a sharing network of the P2P type implementing the invention, when a direct supply of the requested digital data is decided for a P2P client device, this means in the majority of cases that this P2P client device has been assessed by the holding server device as a future effective server for the data requested.

The invention affords, in a sharing network of the P2P type, a substantial improvement in accessibility and availability of the high-resolution images. By virtue of the invention, the machines in the P2P network having low network capacities have the possibility of sharing high-resolution images without having to deliver the same image several times.

In accordance with the invention, said predetermined information can also concern the digital data requested, and in the creating step, the replica of the requested digital data is created according to the digital data requested.

Preferably, according to the invention, the predetermined information relating to the server and/or client devices comprise at least one of the following items of information relating to the ability of the holding server device to fulfill the data server function:

a mean duration of connection to the telecommunications network of the holding server device;

a type of connection to the telecommunications network of the holding server device; and an availability or not of a storage space in the replication server device in order to store therein the digital data replica.

According to another feature, the predetermined information relating to the server and/or client devices comprise at least one of the following items of information relating to the ability of the replication server device to fulfill the data server function:

a mean duration of connection to the telecommunications network of the replication server device;

a type of connection to the telecommunications network of the replication server device; and an availability or not of a storage space in the replication server device in order to store therein the digital data replica.

According to a feature, the predetermined information relating to the server and/or client devices comprise at least one of the following items of information relating to the ability of the client device to in its turn fulfill the data server function:

a type of client device;

a type of connection to the telecommunications network of the client device;

a mean duration of connection to the telecommunications network of the client device; and an availability or not of a storage space in the client device in order to store therein the digital data requested.

The predetermined information relating to the digital data requested comprises at least one of the following items of information:

a number of subsequent potential requests for the digital data requested;

a sharing date for the digital data requested and/or a sharing date for a collection to which the digital data requested belong;

a number of users liable to wish to have access to the digital data requested; and a size of the digital data requested.

According to another particular characteristic of the invention, when the latter is applied in a telecommunications system comprising at least two replication server devices able to store replicated digital data, there is selected, one of the replication server devices in order to replicate therein the digital data requested, this selection being made on the basis of the predetermined information.

In a telecommunications system comprising at least one storage server device made available to a holding server device in a telecommunications network, the invention allows a registration, with the holding server device, of the storage server device as a replication server device able to store digital data replicas of the holding server device.

The above characteristic of the invention is particularly advantageous in the case where the telecommunications system is supported at least partially by the Internet. This is because the providers of access to the Internet (Internet Service Provider or ISP) generally make available to users web storage servers or ftp which the invention makes it possible to register as being replication server devices able to store digital data replicas.

The invention thus advantageously takes advantage of resources which are external to the server device, namely external storage capacities, so as to improve the digital data service in the network.

In a telecommunications system comprising at least two server devices able to hold digital data and to receive requests for supplying this digital data, at least one of the holding server devices being able to act as a proxy server device on behalf of another holding server device, the invention allows a registration of the holding server device able to act as a proxy server device as being a replication server device able to store digital data replicas of said other holding server device.

According to yet other particular characteristics, the method further comprises the following steps, executed in a said holding server device when the latter receives a request coming from said client device, of detecting whether the request is a request to obtain digital data or a digital data replica, and next, in the case of a request to obtain a digital data replica, supplying the replica of digital data requested of the client device, and in the case of a request to obtain digital data, deciding on the basis of the predetermined information on an optimum supply solution for the digital data requested of the client device, between a direct supply by the holding server device and an indirect supply by a replication server device possibly registered with the other holding server device.

According to other aspects, the invention also concerns devices for processing information and digital images, a telecommunications system, as well as an information storage means and a computer program for implementing the methods of the invention described briefly above.

Naturally the various characteristics of the invention presented in the above preamble are independent of the type of digital data and apply without restriction to the particular embodiments described below.

The invention offers embodiments adapted to the processing of data of the multiresolution type comprising in particular image data and/or video data and/or audio data and/or text data.

Other aspects and advantages of the present invention will emerge more clearly from a reading of the description of particular embodiments which will follow, this description being given solely by way of non-limiting example and made with reference to the accompanying drawings.

BRIEF DESCRIPTION OF THE DRAWINGS

FIG. 7A shows an example of a shared digital data table used by the algorithms of the invention;

FIG. 7B shows an example of a server table used by the algorithms of the invention; and FIG. 8 shows a particular hardware configuration of an information processing device suitable for implementation of the method according to the invention.

DETAILED DESCRIPTION

The particular embodiments of the method and device of the invention presented below are described in the general context of a telecommunications system according to the invention, of the hybrid P2P type, which is designed more particularly for sharing multiresolution digital data between a group of users.

In this system of telecommunications according to the invention, a central server can be used for providing a limited number of functionalities such as the connection of the users or for providing a minimum quality of service in the event of fault in the network.

For example, for exchanging personal digital contents such as digital photographs and videos, the central server can maintain a cache of thumbnails (low-resolution versions of the images) allowing continuity of accessibility to the thumbnails. The high-resolution images themselves remain stored in the machines or holding peer devices or replication server devices.

In addition, the digital contents are identified uniquely by a UUID identifier (Universal Unique Identifier). The digital contents can be grouped together in order to form collections of digital contents, such as collections of digital photographs. The collections can themselves be identified uniquely by a UUID identifier.

Each machine forming part of the telecommunications system according to the invention is also identified uniquely by a UUID identifier.

In the telecommunications system according to the invention, the user preferably has on his machine a dedicated P2P application for sharing digital contents, and running through and accessing these on the network. Each server device of the telecommunications system can also comprise a web server in order also to authorize access to digital contents of the network to users through HTML page display tools such as a web browser, an electronic mail reader or other. A user can thus share collections of digital contents with a set of persons, even if some persons do not possess the dedicated P2P application.

Figure 1:
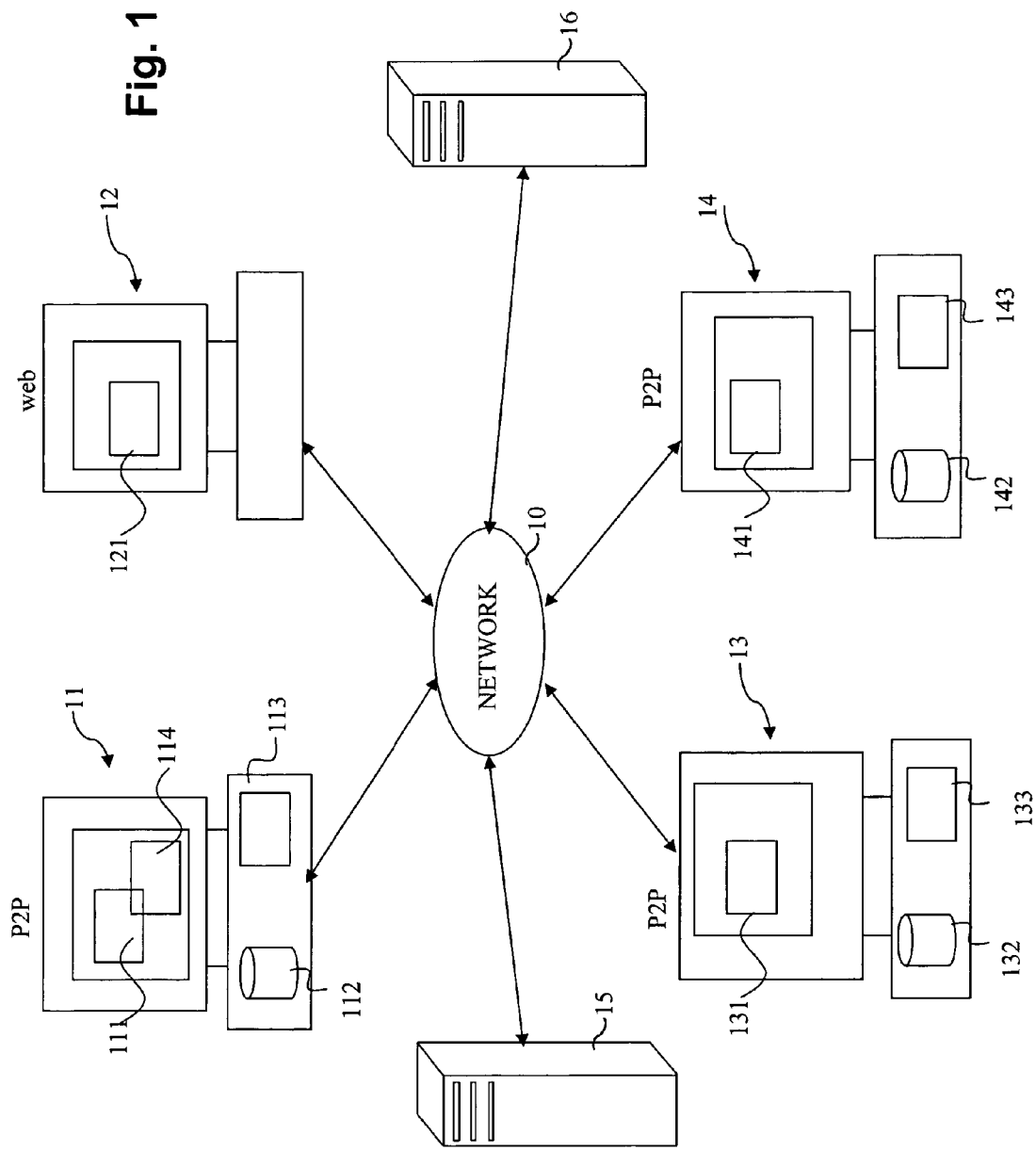
FIG. 1 shows the general structure of a particular embodiment of the telecommunications system according to the invention.

With reference to FIG. 1, a P2P telecommunications system of the hybrid type according to the invention is described in an example of a simplified configuration comprising four terminal devices 11 to 14 and two storage server devices 15 and 16 which are all connected to a telecommunications network 10.

The network 10 is for example formed on top of the Internet, of a private local network (LAN) or a mobile telephony network or a combination of these three networks.

The terminal devices 11 to 14 are connected to the network 10 by various communication means such as for example an xDSL connection, a 56 Kb/s modem, a cable modem, a WiFi wireless link, a cellular telephone connection (for example GSM or UMTS) or other.

In this example of a simplified configuration of the telecommunications system according to the invention, the terminal devices 11 to 14 are divided into two distinct categories. Thus the terminal devices 11, 13 and 14 are peer devices equipped with a dedicated P2P application. The terminal device 12 is a web client which accesses shared resources of the telecommunications system according to the invention through an HTML page display tool.

The terminal devices 11, 13 and 14 provided with the dedicated P2P application form between them a network of the P2P type on the support of the telecommunications network 10 and according to one of the topologies known to persons skilled in the art, such as a centralized topology, decentralized topology with or without super-peers, or a hybrid topology.

The P2P application comprises at least one P2P local server module implementing the invention and a data storage device or cache. P2P local servers 113, 133 and 143 and data storage devices or caches 112, 132 and 142 are installed respectively in the terminal devices 11, 13 and 14.

The P2P local servers 113, 133 and 143 are responsible for responding to the requests for access to the P2P shared resources coming from the client terminal devices.

A request for access to the P2P shared resources can come from distant applications, but also applications which are presented on the same machine as the P2P local server receiving the request. The request is for example received according to a proprietary protocol peculiar to the P2P application or according to the HTTP protocol. When the terminal device is for example a mobile telephone, SMS or MMS messages can be employed for communicating with the telecommunications system according to the invention.

The storage means 112, 132 and 142 contain digital data which are shared on the P2P network by means of P2P local servers 113, 133 and 143. The caches 112, 132 and 142 also contain information relating to digital data replicas and to the state of replication server devices which, in accordance with the invention, are associated with the terminal devices 11, 13 and 14, as will become clearer hereinafter.

In this example of a simplified configuration of the telecommunications system according to the invention, a replication server device can be one of the storage server devices 15 and 16 and P2P local servers of the terminal devices 11, 13 and 14.

As shown in FIG. 1, the dedicated P2P application can also be supplemented by a client P2P application in the form of the applications 111, 131 and 141 installed respectively in the terminal devices 11, 13 and 14. The client P2P applications 111, 131 and 141 offer an interface to the users enabling them to seek, access, display and share digital data on the P2P network.

As shown also in FIG. 1 for the terminal devices 11 and 12, HTML page display tools 114 and 121 can also be installed respectively in the terminal devices 11 and 12 in order to allow these access to digital data by means of the HTTP communication protocol, whether or not they are equipped with the dedicated P2P application.

The storage server devices 15 and 16 are for example machines in which the users possess respective storage spaces available to them, these respective storage spaces being accessible in read mode to the whole of the network.

In accordance with a preferred embodiment of the invention, the storage server devices 15 and 16 are for example web servers such as those offered to their clients by Internet Service Providers (ISPs). This is because, in this type of web server, the user generally has the possibility of freely storing digital data by means for example of a protocol such as FTP, File Transfer Protocol. The digital data stored are then accessible by means for example of a protocol such as HTTP.

In the remainder of the description, for reasons of convenience, the terms "server device" or "local server" can be used indifferently and refer to the function fulfilled by the P2P local server of the corresponding terminal device. For the same reasons, the terms "holding server device" and "client device" are employed also and refer respectively to the P2P local server of the corresponding terminal device which receives a request for obtaining digital data which it holds and to the terminal device originating the request through its client P2P application or its HTML page display tool.

Figure 2:
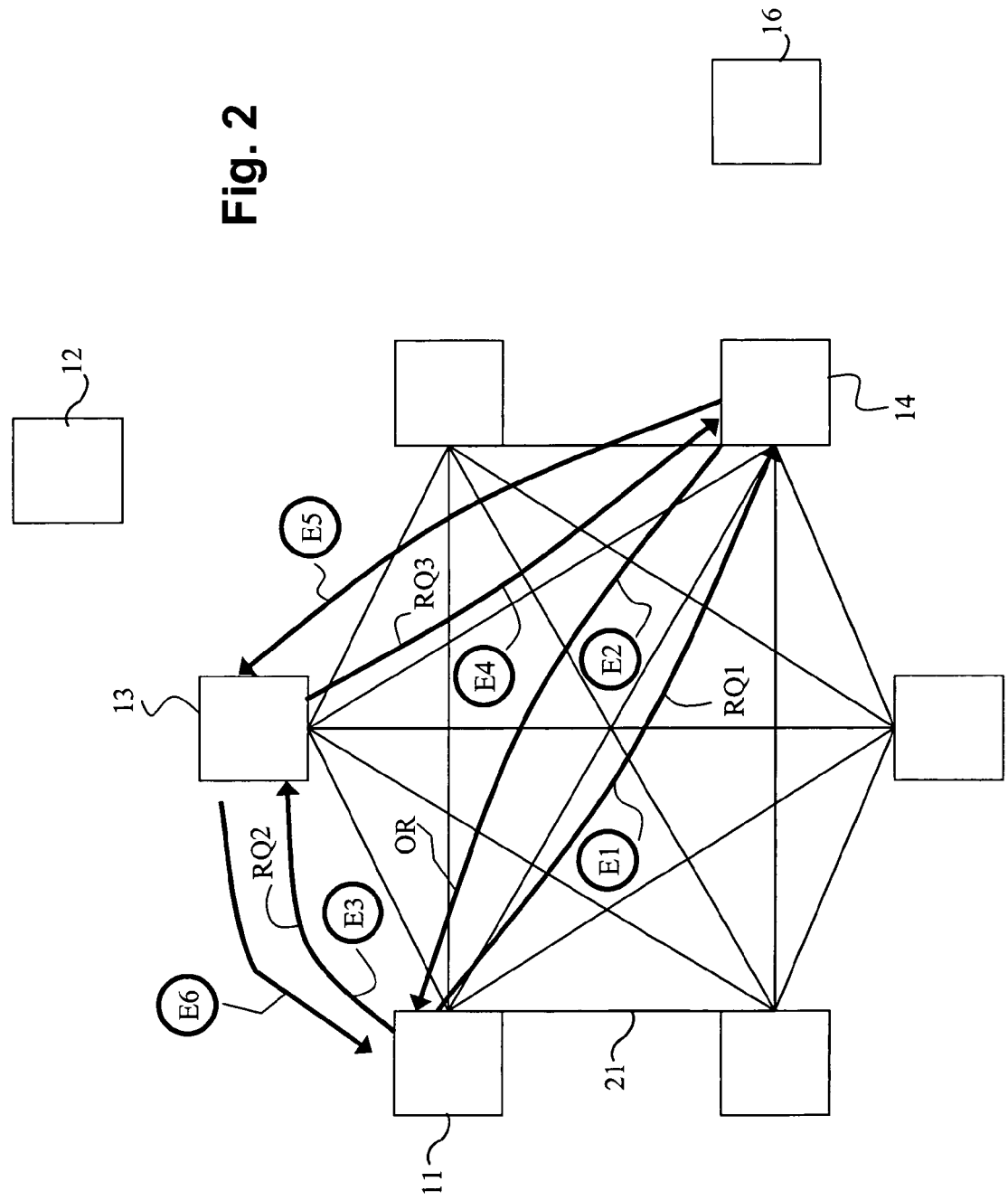
FIG. 2 shows a first example of a message exchange sequence in the telecommunications system according to the invention for the case of a replication server function fulfilled by a proxy server device.
Figure 3:
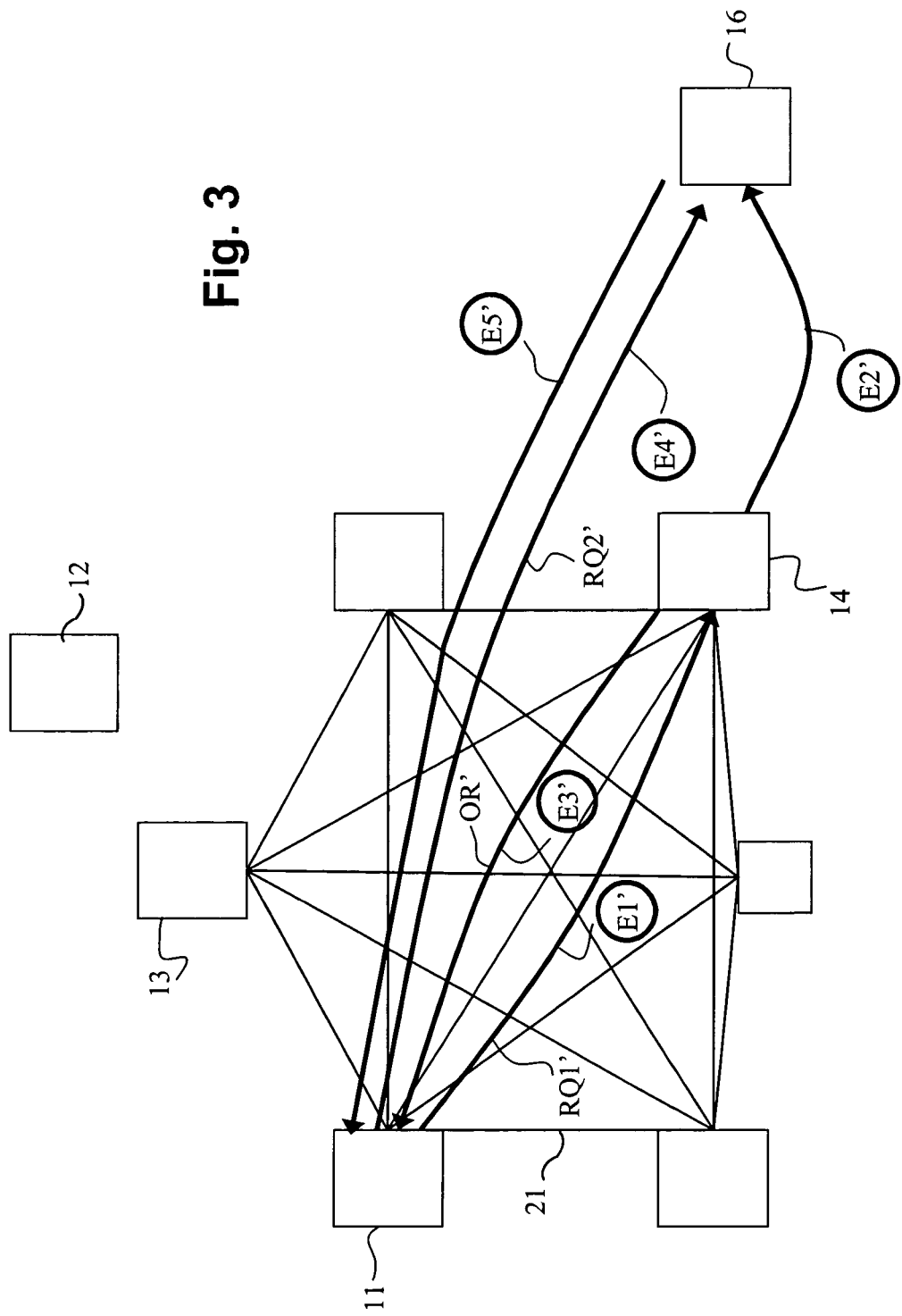
FIG. 3 shows a second example of a message exchange sequence in the telecommunications system according to the invention for the case of a replication server function fulfilled by a storage server device.

In order to facilitate understanding of the invention, a description is now given of the examples of first and second message exchange sequences in the telecommunications system according to the invention, with reference respectively to FIGS. 2 and 3.

The first sequence described in relation to FIG. 2 corresponds to a case presented by way of example in which digital data held by the terminal device 14 are replicated in the terminal device 13.

As shown in FIG. 2, the terminal devices 11, 13 and 14 form between them a P2P network 21 on top of the telecommunications network 10 (not shown in this figure).

It is considered in this example that the terminal device 14 has collections of digital data which it offers to share with the other terminal devices in the network by means of its P2P local server 143.

It is also considered that the terminal device 13 is previously registered with the terminal device 14 as an agent server device (proxy) in order to serve if necessary as a cache for digital data which the terminal device 14 wishes to share. When it is registered, the terminal device 13 communicates to the terminal device 14 information such as the type of connection (for example 512 Kb/s ADSL, 128 Kb/s ADSL, 56 Kb/s PSTN etc), its mean duration of connection, as well as the disk space made available to the terminal device 14 for storing digital data. After this registration, at each connection/disconnection of the terminal devices 13 and 14, the information registered is updated by an exchange of messages between them.

It is also considered in this example that the storage server device 16 has a disk space available to the user of the terminal device 14. The user has previously registered with his P2P local server 143 the existence of the storage server device 16, specifying identification and authentication elements for the device 16 as well as the maximum disk space available in the latter in order to store digital data to be shared therein. The identification and authentication elements of the storage server device 16 comprise in particular the network address, the access protocol and an account name or "login" and a password enabling the P2P local server 143 to connect to the device 16 automatically, that is to say without intervention from the user, in order to place digital data in it or to withdraw them.

In this particular embodiment, when the user of the terminal device 11 wishes to access digital data shared on the terminal device 14, for example a high-resolution image, it can display a collection incorporating these digital data and send a request RQ1 for obtaining digital data to the P2P local server 143 of the terminal device 14, step E1, through the client P2P application 111 or the HTML page display tool 114.

The request RQ1 can take the form of an HTTP request of the GET type well known to persons skilled in the art. For example:

GET /get_image?uuid=<im_id>&cuid=<collection_id> HTTP/1.1 in which

GET indicates that it is a case of a request and HTTP/1.1 indicates the version of the protocol used;

the URL (Uniform Resource Locator) /get_image?uuid=<image_id>&cuid=<collection_id> indicates that it a case of a request for obtaining an image, considering that the function /get_image is implemented by the P2P local servers 113, 133 and 143; and the parameters uuid and cuid are respectively the unique identifier of the image <image_id> and the unique identifier of the collection <collection_id>, of which the digital data requested form part.

In accordance with the invention, the holding server device 14 analyzes a certain number of predetermined items of information INF relating to various protagonists and/or to the nature of the digital data requested before deciding, on the basis of this information INF, on an optimum supply solution for the digital data requested. The above-mentioned protagonists comprise, in this example, the holding server device 14 itself, the client device 11, the proxy server device 13 and the storage server device 16.

In accordance with the invention, the holding server device 14 decides, on the basis of the information INF, between two supply solutions which consist, in this example, either of directly serving the digital data requested to the client device 11, or serving them through another server, that is to say here the proxy server device 13 or the storage server device 16, creating a replica of the digital data requested in said other server.

The message exchange sequence depicted schematically in FIG. 2 relates to the case where the holding server device 14 determines that it is preferable to serve the digital data via the proxy server device 13.

At step E2, the P2P local server 143 of the terminal device 14 returns to the client device 11 a redirection instruction OR indicating to it that it must reiterate its request for digital data to the proxy server device 13.

At step E3, the client device 11 returns a request RQ2 for obtaining digital data to the proxy server device 13. The request RQ2 contains redirection information indicating that the request corresponds to a redirection requested by the holding server device 14. The proxy server device 13 is thus informed of the fact that it must process the request RQ2 as a proxy server device of the holding server device 14. According to a variant, the redirection information also enables the terminal device 13 to manage its digital data cache separately when it uses it for itself as a simple P2P client of the cache made available to the holding server device 14. A total hoarding of the memory space of the terminal device 13 by the cache of the holding server device 14 is thus made impossible.

On reception of the request RQ2 coming from the client device 11, the proxy server device 13 first of all checks whether it is a case of a request resulting from a redirection request coming from the holding server device 14. In the affirmative and if the digital data requested are actually available in its cache, the proxy server device 13, at step E6, returns the digital data requested to the client device 11. In the contrary case, at step E4, the proxy server device 13 sends to the holding server device 14 a request RQ3 to obtain the digital data requested.

On reception of the request RQ3, at step E5, the holding server device 14, having determined that the request RQ3 comes from the proxy server device 13, immediately returns the requested digital data to the latter.

According to a variant, the holding server device 14 stores in memory the fact that it has issued a redirection for given digital data so as to directly serve only the digital data which were the subject of a redirection. The requests not corresponding to a redirection, even when they come from a terminal device registered as a proxy server, such as the terminal device 13, are then processed as a normal request RQ1.

When the digital data are received in the proxy server device 13, these are stored in the cache of the proxy server device 13 allocated to the holding server device 14 and are then sent to the client device 11.

One advantage of the invention appears here clearly if it is considered for example that the terminal device 11 is incapable of redistributing the digital data received since it is a case of a simple web client, such as the terminal device 12, not possessing the P2P application, that the terminal device 14 is connected via a low-speed telephone link, such as 56 Kb/s PSTN, and that the terminal device 13 is connected via an always-on ADSL connection. Moreover, for a terminal device having a low-speed connection, such as the terminal device 14, serving digital data is a sizeable task especially if the data have a large size as in the case of an image. Moreover, if a terminal device other than the terminal device 11 wished to access subsequently the same digital data as those downloaded by the terminal device 11, it could not obtain them through the latter since the latter does not form part of the P2P network in this example. The terminal device 14 would then once again be acted on in order to supply these same digital data. Having stored the digital data on the terminal device 13, these are available immediately and more rapidly through the high-speed always-on ADSL connection of the terminal device 13.

As a variant of the above case, consider for example that the terminal device 14 is a mobile telephone provided with a photographic apparatus and that the client device 11 wishes to access the high-resolution image stored in the terminal device 14. The request RQ1 is received by the holding server device 14 at step E1 in the form of an MMS message. The holding server device 14 then determines that it may have to serve the same image several times, because of the sharing of the image with several persons, and consequently decides to transfer the image to the proxy server device 13 (which it did at step E5). The terminal device 13 is for example, in this case, a personal computer installed at the residence of the owner of the mobile telephone. At step E2, the proxy server device 13 informs the client device 11 that the image is present on the proxy server device 13. The client device 11 next requests the image again from the proxy server device 13, steps E3 and E6.

The second message exchange sequence described in relation to FIG. 3 corresponds to a case presented by way of example in which digital data held by the terminal device 14 are replicated in the storage server device 16.

At step E1', the P2P local server 143 of the terminal device 14 determines, after having received a request RQ1 for digital data coming from the client device 11, that it is preferable to create a replica of the digital data requested on its storage server device 16.

At step E2', the holding server device 14 places a replica of the digital data on the storage server device 16, applying the algorithm according to the invention described later in the description with reference to FIG. 6.

At step E3', the holding server device 14 returns a redirection instruction OR' to the client device 11, indicating to it the URL to be used for accessing the digital data on the storage server device 16.

At step E4', the client device 11 reiterates its request for the digital data by transmitting a request RQ2' to the storage server device 16 by means of the URL which was transmitted to it at step E3'.

At step E5', on reception of the request RQ2', the storage server device 16 transmits to the client device 11 the digital data designated by the URL contained in the request RQ2'.

According to the invention, the decision rule for an optimum digital data supply solution combines a certain number of criteria relating to the ability to operate as a server of the original holding terminal device for the digital data requested (server device 14 in the above examples in FIGS. 2 and 3), with the properties of the digital data requested and with the capacities of the client terminal device (client device 11 in the above examples of FIGS. 2 and 3), of a proxy terminal device (proxy server device 13 in the above example in FIG. 2) or of a storage server device (storage server device 16 in the above example in FIG. 3) to be in their turn an effective server for the digital data concerned.

The aforementioned criteria taken into account in the decision on an optimum supply solution for requested digital data will be detailed hereinafter, in the paragraphs relating to the description of FIG. 5.

Figure 4:
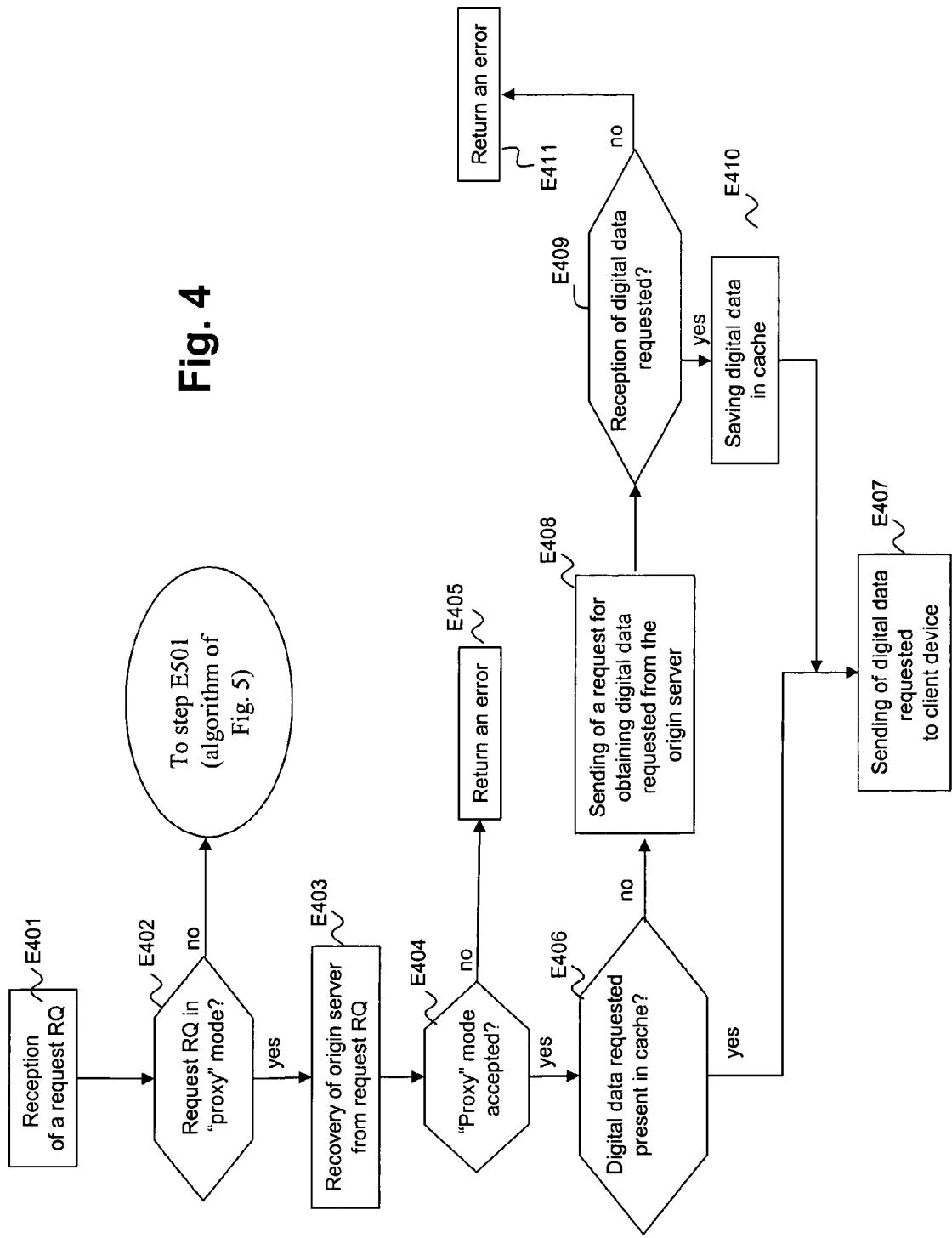
FIG. 4 is a functional flow diagram relating to the behavior of a P2P local server in "proxy" mode according to the invention when a request to obtain digital data is received.

With reference to FIG. 4, a description is now given of a functional flow diagram illustrating the behavior of the P2P local server of a terminal device according to the invention when it operates in an operating mode of the agent or "proxy" type.

More precisely, the functional flow diagram of FIG. 4 illustrates the behavior of the P2P local server when any request RQ received by the latter is identified as being a request of the "proxy" type, which corresponds in the example in FIG. 2 to the behavior of the P2P local server 133 of the terminal device 13 when the latter receives the request RQ2 at step E3.

As shown in FIG. 4, at step E401, the server device receives the request RQ for the supply of digital data.

The request RQ is for example a request of the HTTP type in the form:
GET/
get_image?uuid=<image_id>&cuid=<collection_id>& origin-server=<origin-server_id>HTTP/1.1,
in which:
GET indicates that it is a case of a request, with a URL indicating the object of the request and HTTP/1.1 indicating the version of the protocol used;
theURL/
get_image?uuid=<image_id>&cuid=<collection_id>& origin-server=<origin-server_id>indicates that it is a case of a request for obtaining an image whose unique identifier is <image_id>, that this image is drawn from a collection whose unique identifier is <collection_id>and finally that it is a case of a request RQ requesting the server device receiving the request RQ to fulfill the role of a proxy server on behalf of the origin-server server device whose unique identifier is <origin-server_id>. It should be noted that, when the keyword "origin-server" is absent, the request is not a "proxy" request and the server device receiving the request then behaves in accordance with the algorithm in FIG. 5, which is described below.

At step E402, the server device determines, from the URL indicated in the request RQ, whether or not an origin-server is specified. When an origin-server is specified, the algorithm continues with step E403. In the contrary case, the processing of the request RQ continues in accordance with the algorithm in FIG. 5.

At step E403, the server device recovers the unique identifier UUID of the origin-server and checks at step E404, from its local data, whether or not it is registered as a proxy with the origin-server designated by the recovered unique identifier UUID.

In the case where the server device does not recognize itself as a proxy, the request RQ is not acceptable and it then returns an error, at step E405, to the client device sending the request RQ.

If the server device is indeed registered as a proxy with the origin-server designated in the URL, it checks, at step E406, in its digital data cache, whether or not the digital data identified by <image_id>are present. In a variant according to which the server device manages a digital data cache associated with the origin-server, the server device checks the presence of the data in the cache associated with the origin-server.

When the digital data requested at step E401 are actually in the cache of the server device, they are transmitted to the client device, at step E407, in response to the request RQ. In the contrary case, that is to say if the digital data requested are not present locally in the cache of the server device, at step E408, the server device sends a request to obtain digital data from the origin-server.

Step E409 is a step of awaiting digital data requested of the origin-server at step E408.

When the data requested at step E408 are actually received at step E409, they are saved locally in the cache of the server device, step E410, before being transmitted to the client device in response to the request RQ received at step E401. In the contrary case, step E411 is provided in order to return an error to the client device.

Figure 5:
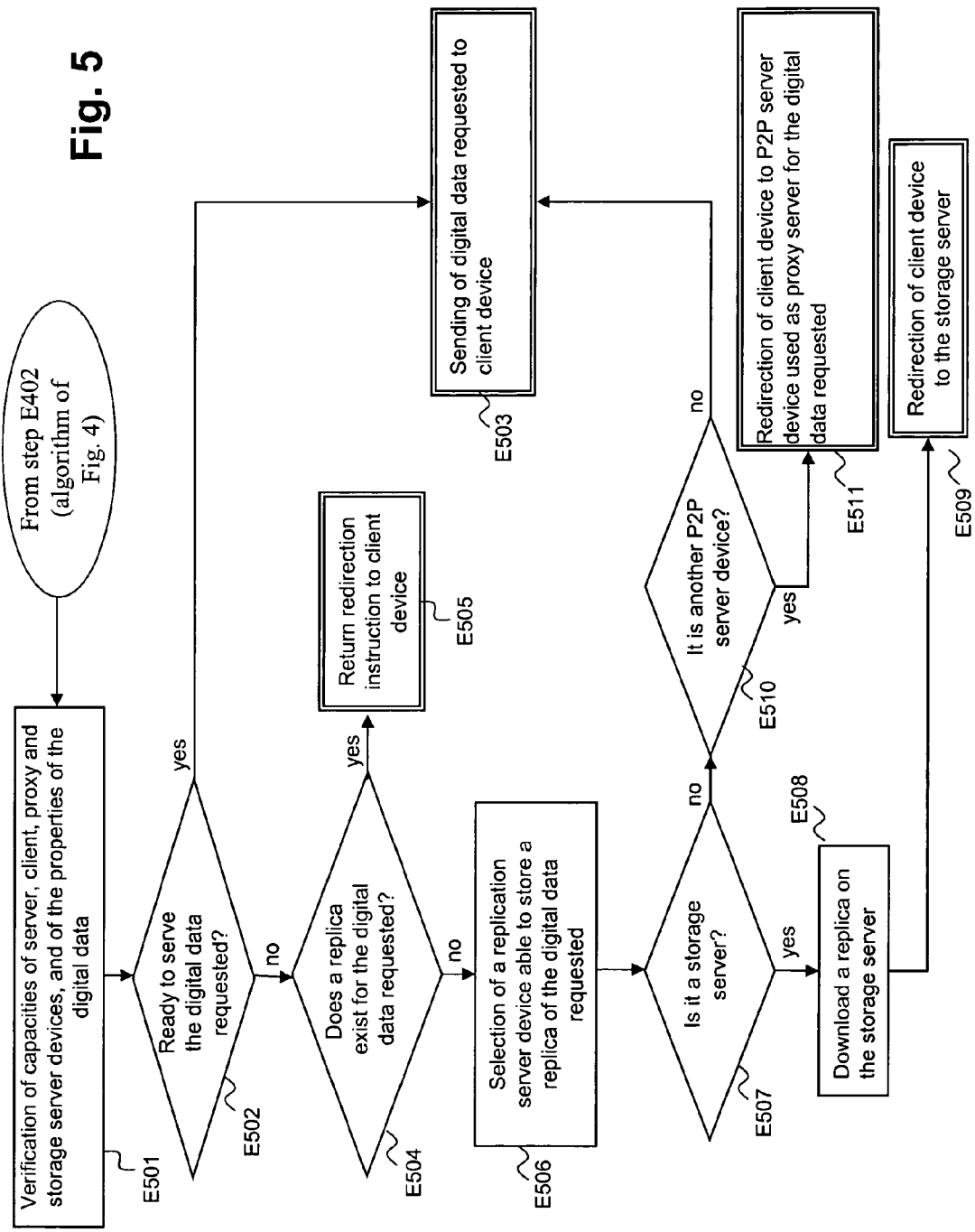
FIG. 5 is a functional flow diagram relating to the behavior of a P2P local server according to the invention when a request to obtain digital data is received.

With reference to FIG. 5, a functional flow diagram is now described illustrating the behavior of the P2P local server of a terminal device according to the invention when the decision is made on an optimum supply solution for the digital data requested.

The functional flow diagram in FIG. 5 corresponds in the examples in FIGS. 2 and 3 to the behavior of the P2P local server 143 of the terminal device 14 when the latter receives a request RQ1, RQ1', at step E1, E1'.

The algorithm in FIG. 5 is executed following steps E401 and E402 in FIG. 4, when any request RQ received by the server device is not identified as being a request in proxy mode.

At step E501, the holding server device recovers first of all the information INF relating to its inherent abilities to operate as a server, to those of the client device and to the properties of the digital data requested, in order to decide, on the basis of criteria established from the information INF, on an optimum supply solution between that consisting of supplying the digital data directly to the client device and that consisting of redirecting the client device to a replica of the digital data.

More precisely, the information INF relating to the capacities of a holding server device to operate as a server comprise in particular:
the mean duration of connection of the holding server device;
the type of connection of the holding server device (56 Kb/s PSTN, 512 Kb/s ADSL etc); and
the existence of one or more storage server devices or proxy server devices attached to the holding server device in question.

The information INF relating to the properties of the digital data requested comprises in particular:
the number of requests for the digital data in question;
the date of sharing of these digital data or of the collection to which they belong;
the number of users liable to wish to access these digital data; and
the size of these digital data.

The information INF related to the capacities of a client device, of a proxy server device or of a storage server device liable to receive digital data requested to operate as a server comprises in particular:
the type of device (P2P, web, proxy);
the type of connection of the device (56 Kb/s PSTN, 1024 Kb/s ADSL, etc);
the mean duration of connection of the device; and
the storage space available in the device.

Thus, for example, in the case of an HTTP request, it is easy to determine whether the client device is a P2P client or a web client by examining the value of the User-Agent header of the HTTP request.

When it is a case of a P2P client device, the latter can also supply with the request information on its type of connection to the network 10, its mean duration of connection and its disk space available, for example in the form of comments in the User-Agent header of the HTTP request.

The HTTP request is then for example in the following form:
1) GET/get_image?uuid=<image_id>&cuid= <collection_id>HTTP/1.1
2) User-Agent: <ApplicationName>/<version> (type=ADSL512; duration=30:20:00; dispo=10000),
  in which the first line 1) describes the object of the request as described previously and the second line 2), commencing with User-Agent, describes the client device originating the request.

In the second line 2), the information <ApplicationName> and <version> define respectively the type of client device and the version thereof and are followed by comments associated with <ApplicationName>. Thus, for example, if the request comes from a web client such as Netscape 7.1, <ApplicationName> has the value "Mozilla" and <version> has the value "5.0".

In accordance with the invention, in the case of a P2P client device, the comments of the User-Agent header describe the type of connection of the client device, its mean duration of connection and its available disk space, that is to say, in the above example, ADSL512 for the connection type, 30 (hours):20 (minutes): 00 (seconds) for the mean duration of connection and 10,000 Kb for the disk space available.

At step E502, according to the various capacities and properties determined, the holding server device decides to serve the digital data requested directly to the client device or to supply them via a replication server device.

A non-exhaustive list of decision rules applicable to this particular embodiment of the invention is given below by way of example, in order of priority:
- If the holding server device does not have a proxy server device registered nor a storage server device, it then takes the decision to serve the digital data requested;
- If the holding server device has a low-speed connection, that is to say below a predetermined threshold S0 (for example 56 Kb/s PSTN), and the server capabilities of the client device are less than the server capabilities of one of the proxy server devices or one of the storage server devices of the holding server device, in terms of bandwidth and mean connection time, the holding server device decides to create a replica of the digital data requested;
- If the difference between the date of sharing the digital data requested and the current date is less than a predetermined threshold S1 (for example 30 days) and the number of terminal devices with which the digital data have been shared is greater than a predetermined threshold S2 (for example a collection shared between at least two persons) and the size of the digital data is greater than a predetermined size S3 (for example the size of a 60 Kb thumbnail) then the holding server device decides to create a replica of the digital data requested;
- If the holding server device has a high-speed connection (for example 1024 Kb/s ADSL) and its mean connection time is higher than a predetermined threshold, it then decides to serve the digital data requested directly; and
- If the holding server device has knowledge of a storage server device which is associated with it, if the digital data requested have a size above a predetermined threshold and if the client device is a web client, it then decides to create a replica of the digital data requested on the associated storage server device.

In the case where the holding server device has decided to serve the digital data directly to the client device, step E503 is executed in order to send them to the client device.

In the contrary case, step E504 is executed in order to determine whether there exists a replica of the digital data requested which would be available on a storage server device or a proxy server device.

If such a replica exists in a storage server device, the holding server device returns to the client device a redirection instruction OR in which there are indicated the address of the storage server device and the location of the replica of the digital data in it.

For example, if the HTTP protocol is used for returning the redirection instruction, the redirection instruction can then take the following form:
1) HTTP/1.1 302 See other URI
2) Location: <protocol>://<storage_server>/<location>/<file_name>
  in which,
    the first line 1) indicates to the client device that it is a case of a redirection instruction, and
    the second line 2) indicates the URL, that is to say the address of the digital data on the network.

In this URL, <protocol> indicates the protocol to be used for the request, <storage_server> indicates the address of the storage server device having the digital data, <location> indicates the location of the digital data on the storage server device and <file_name> indicates the name of the file corresponding to the digital data requested.

When the holding server device knows no replica of the digital data requested, it selects, at step E506, from amongst the storage server devices known to it and the proxy server devices registered with it, a replication server device able to receive a replica of the digital data requested.

In accordance with a preferred embodiment of the invention, if the holding server device has a choice between storage server devices and proxy server devices, it will favor storage server devices, which have the particularity of offering a better availability compared with proxy server devices maintained by users.

At step E507, the holding server device determines whether or not the replication server device selected at step E506 for the replication is a storage server device.

In the affirmative, at step E508, the holding server device downloads a replica of the digital data requested on the storage server device selected for the replication, according to the algorithm described below with reference to FIG. 6. Next, at step E509, the holding server device returns to the client device a redirection instruction OR similar to that of step E505.

In the contrary case, that is to say in the case where the replication server device selected at step E506 is not a storage server device, step E510 is executed following step E507 in order to determine whether or not the replication server device selected is a P2P server device agreeing to operate as a proxy server device. In the affirmative, at step E511 the holding server device returns to the client device a redirection instruction OR in the following form, for example in HTTP language:
1) HTTP/1.1 302 See other URI
2) Location: http://<svr_proxy>/ get_image?uuid=<im_id>&cuid=<coll_id>&origin-server=<m_id> in which,
the first line 1) indicates that it is a case of a redirection order, and
the second line 2) indicates the new HTTP request to be used for accessing the replica.

In addition, <svr_proxy> indicates the address of the proxy server device to be contacted, <im_id> indicates the identifier of the digital data, <coll_id> indicates the identifier of the collection to which the digital data belong and <m_id> corresponds to the unique identifier of the holding server device so that the proxy server device knows the origin of the redirection instruction received.

In the case of a negative response at the conditional step E510, that is to say in the case where no replication server device has been able to be selected at step E506 for storing a replica of the digital data requested, the holding server device serves the digital data requested directly to the client device, step E503.

Figure 6:
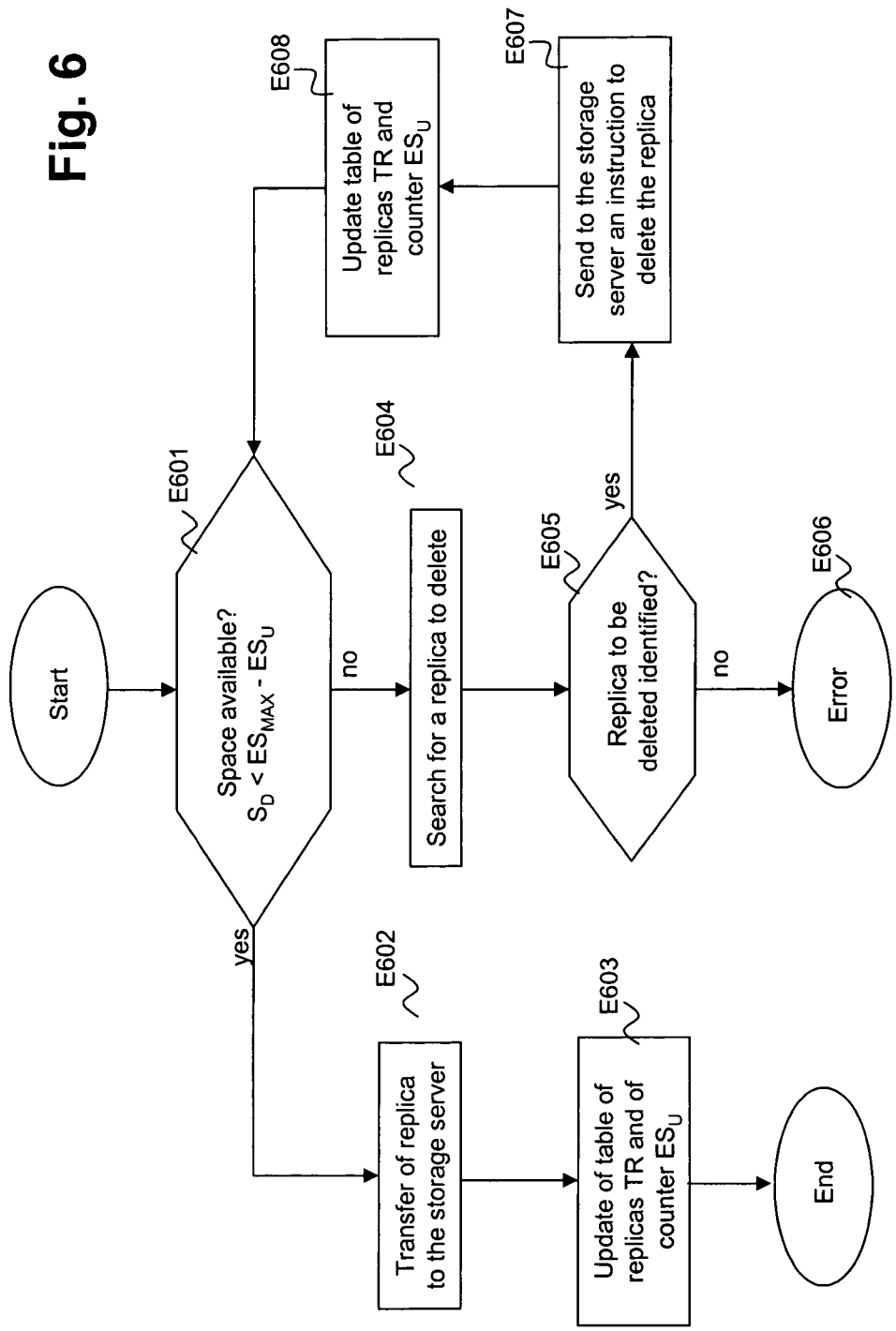
FIG. 6 is a functional flow diagram relating to the management of the storage space of a storage server device.

With reference to FIG. 6, a description is now given of a functional flow diagram illustrating the management of the storage space of a storage server device, such as for example the device 15 or 16.

When a storage server device has been selected for receiving a replica of the digital data requested, the holding server device determines at step E601 whether there is enough storage space on the storage server device to receive the replica. The references $S_D$, $ES_{MAX}$ and $ES_U$ designate respectively the size of the digital data to be duplicated, the maximum storage space made available to the user by the storage server device and the storage space already occupied by the data of the user.

At step E601, when the inequality $S_D < ES_{MAX} - ES_U$ is satisfied, this means that the storage space available in the storage server device is sufficient to store the replica of the digital data. The digital data are then downloaded at step E602 onto the storage server device.

The transfer of the digital data of the replica to the storage server device can be carried out by means of communication protocols well known to persons skilled in the art, for example by means of the PUT command of the FTP protocol.

At step E603, once the transfer of the digital data has been carried out, the storage server device updates a replica table TR which is associated with it by integrating into this table TR the identifier UUID of the digital data transferred, the location on the storage server device where the replica is situated, the size of the replica and the current date. In addition, the counter $ES_U$ is also updated, $ES_U = ES_U - S_D$.

At step E601, in the case where the space available on the storage server device proves insufficient, that is to say if $S_D > ES_{MAX} - ES_U$, the algorithm next executes step E604.

At step E604, the algorithm selects in the storage server device a replica to be deleted so as to release sufficient storage space for the new replica. For this, the algorithm seeks in the table of replicas TR of the storage server device the replica having the oldest access date.

At step E605, the algorithm checks whether or not a replica to be deleted has been selected at step E604.

In the affirmative, at step E607, the holding server device sends a deletion instruction for the replica selected to the storage server device, for example by means of the DELETE command of the FTP communication protocol.

In the contrary case, that is to say if no replica to be deleted has been selected at step E604, an error is returned, at step E606, to the holding server device in order to indicate to it that it is impossible to create a replica of the digital data in the storage server device. The holding server device then has the possibility of selecting another machine which is associated with it for replication, that is to say a proxy server device or another storage server device, or to directly transfer the digital data to the client device.

In the case where it has actually been possible to delete a replica, step E608 is executed following step E607.

At step E608, the table of replicas TR is updated by deleting therein the entry corresponding to the deleted replica and the counter $ES_U$ is incremented by the size of deleted replica, a size which is obtained by consulting the table TR.

After the execution of step E608, the algorithm returns to step E601 and continues according to the process described above until sufficient storage space has been released in the storage server device in order to place therein the new replica or until an error appears.

FIGS. 7A and 7B show examples of a shared digital data table 71 and a table of servers 72 used by the algorithms of the invention, for the case of the illustrative example described with reference to FIGS. 2 and 3. In the illustrative example of FIGS. 2 and 3, the tables 71 and 72 can be located in the holding server device 14.

The table of shared digital data 71 makes it possible to associate with each shared digital data identifier the identifier of the server containing the data, namely, in this illustrative example, the proxy server device 13, the storage server device 15 or the holding server device 14. In the case of a storage server device managed remotely, namely the replication server device 15 here, or of the holding server device 14, it is necessary to associate the access path. Information characteristic of the digital data such as the size and date are also stored in the table 71.

The table of servers 72 makes it possible to store, for each server, important characteristics which are useful in the selection steps, namely, non-exhaustively, the current address of the server, the maximum storage space $ES_{MAX}$, the storage space used $ES_U$, the type of server, the type of connection, the mean connection duration and the state of the connection (connected/disconnected). In the case of a storage server device, namely the device 15 here, the table 72 also preferably contains the account name or "login" and the corresponding password for the access control operations.

With reference to FIG. 8, a description is now given by way of example of a particular hardware configuration of an information processing device suitable for implementation of the method according to the invention.

An information processing device implementing the invention is for example a microcomputer 80, a work station, a personal assistant, or a mobile telephone connected to various peripherals. According to yet another embodiment of the invention, the information processing device is in the form of a photographic apparatus provided with a communication interface for allowing connection to a network.

The peripherals connected to the information processing device comprise for example a digital camera 81, or a scanner or any other image acquisition or storage means, connected to an input/output card (not shown) and supplying multimedia data to the information processing device.

The device 80 comprises a communication bus 801 to which there are connected:
a central processing unit CPU 802 in the form for example of a microprocessor;
a read only memory 803 in which there can be contained the programs whose execution allows the implementation of the method according to the invention;
a random access memory 804 which, after the powering up of the device 80, contains the executable code of the programs of the invention as well as registers adapted to record variables and parameters necessary for implementing the invention;

a screen 805 for displaying data and/or serving as a graphical interface with the user, who can thus interact with the programs of the invention, by means of a keyboard 806 or any other means such as a pointing device, such as for example a mouse 807 or an optical pen;

a hard disk 808 or a storage memory, such as a memory of the compact flash type, able to contain the programs of the invention as well as data used or produced during the implementation of the invention;

an optional disk drive 809, or another removable data medium reader, able to receive a floppy disk 82 and read/write thereon data processed or to be processed in accordance with the invention; and a communication interface 810 connected to the telecommunications network 10, the interface 810 being able to transmit and receive data.

In the case of audio data, the device 80 is preferably equipped with an input/output card (not shown) which is connected to a microphone 84.

The communication bus 801 allows communication and interoperability between the various elements included in the device 80 or connected thereto. The representation of the bus 801 is not limiting and in particular the central unit 802 is able to communicate instructions to any element of the device 80 directly or by means of another element of the device 80.

The floppy disks 82 can be replaced by any information medium such as for example a compact disk (CD-ROM), rewriteable or not, a ZIP disk or a memory card. In general terms, an information storage means, which can be read by a microcomputer or by a microprocessor, integrated or not into the information processing device, possibly removable, is adapted to store one or more programs whose execution makes it possible to implement the method according to the invention.

The executable code enabling the information processing device to implement the invention can be stored either in read only memory 803, on the hard disk 808 or on a removable digital medium such as for example a floppy disk 82 as described previously. According to one variant, the executable code of the programs is received by means of the telecommunications network 10, via the interface 810, in order to be stored in one of the storage means of the device 80 (such as the hard disk 808 for example) before being executed.

The central unit 802 controls and directs the execution of the instructions or portions of software code of the program or programs of the invention, the instructions or portions of software code being stored in one of the aforementioned storage means. When the device 80 is powered up, the program or programs which are stored in a non-volatile memory, for example the hard disk 808 or the read only memory 803, are transferred into the random access memory 804, which then contains the executable code of the program or programs of the invention, as well as registers for storing the variables and parameters necessary for implementing the invention.

It should also be noted that the device implementing the invention or incorporating it can also be produced in the form of a programmed apparatus. For example, such a device can then contain the code of the computer program or programs in a fixed form in an application-specific integrated circuit (ASIC).

The invention claimed is:

1. A method of distributing a digital file of digital data to a requesting client device in a telecommunications network, the network comprising a peer-to-peer holding server device holding said digital file and operating as a peer of a peer-to-peer sub-network of said telecommunications network, at least one replication server device operating as either a peer-to-peer replication server device of the sub-network or as a storage server in the telecommunications network, and a client device, the method comprising the following steps implemented by the peer-to-peer holding server device:

preliminarily registering the replication server devices with said peer-to-peer holding server device;

receiving a request from said client device to obtain the digital file;

obtaining predetermined information relating to abilities of the peer-to-peer holding server device and each of the registered replication server devices to operate as servers to supply data;

upon reception of said request, deciding between a direct supply solution where the peer-to-peer holding server device directly supplies the client device with the digital file, and an indirect supply solution where the digital file is supplied by one of the registered replication server devices, the decision being made by the peer-to-peer holding server device based on the obtained predetermined information;

in a case where the indirect supply solution is decided:

selecting one of the registered replication server devices among said registered replication server devices, based on the obtained predetermined information, wherein the selecting of the registered replication server comprises determining whether any of the registered replication server devices already stores said digital file, and in a case where it is determined that none of the registered replication server devices already stores said digital file, the method further comprises:

a) selecting one of the registered replication server devices that operates as a storage server in the telecommunications network; and uploading from the peer-to-peer holding server device a replica of the digital file to said selected replication server device before redirecting the client device; or b) selecting a replication server device operating as a peer-to-peer replication server device of the sub-network; and creating by the peer-to-peer holding server device a replica of the digital file in said selected peer-to-peer replication server device after redirecting the client device;

redirecting the requesting client device to the selected replication server device for obtaining a replica of the digital file; and in a case where the direct supply solution is decided, supplying the requesting client device with said digital file from the peer-to-peer holding server device as a peer of the peer-to-peer sub-network.

2. The method according to claim 1, wherein the telecommunications network comprises at least one replication server device operating as a peer-to-peer replication server device of said sub-network and at least one replication server device operating as a storage server in the telecommunications network.

3. The method according to claim 1, further comprising:

receiving, by a peer of said sub-network, a request from the client device to obtain the digital file; and subsequent to receiving the request from the client device, determining by the peer, based on said request, whether the peer is requested as a holding server device and then applying the step of deciding between the direct supply solution or the indirect supply solution of the digital file, or whether the peer is requested as a replication server device and then supplying said client device with the digital file.

4. The method according to claim 3, wherein the determining comprises verifying whether said request comprises a redirection instruction identifying a peer holding server device with which said peer of the sub-network is registered, and in a case of a positive verification, supplying the digital file to said requesting client device, or in a case of a negative verification, applying the steps of obtaining the predetermined information and deciding the supply solution.

5. The method according to claim 1, wherein the redirecting comprises sending a redirection instruction identifying the selected replication server device and the peer holding server device.

6. The method according to claim 5, wherein the selected replication server device operates as a peer of the sub-network, the method further comprising:

receiving, by the selected replication server device, a request from the redirected client device to obtain the digital file; and upon reception of said request from the redirected client device, sending, by the selected replication server device, a peer-to-peer request to the holding server device identified in the redirection instruction to obtain the digital file; and receiving a replica of the digital file from the requested holding server device.

7. The method according to claim 5, further comprising the following steps implemented in the peer holding server device:

storing an identification of the redirection instruction sent by the holding server device; and verifying, upon reception of a request from a replication server device to obtain the digital file, whether the request comprises a stored identification, wherein, in a case of a positive verification, supplying a replica of said digital file to said replication server device requesting the digital file, and in a case of a negative verification, applying the steps of obtaining and deciding.

8. The method according to claim 1, wherein the registering comprises specifying whether the at least one replication server device is a peer-to-peer server agreeing to operate as a proxy server device.

9. The method according to claim 1, wherein said predetermined information relating to said holding server device and said replication server device comprises at least one of the following items of information relating to the ability of the holding server device to fulfill the data server function: a mean duration of connection to said telecommunications network of said holding server device, and a type of connection to said telecommunications network of said holding server device.

10. The method according to claim 1, wherein said predetermined information relating to said holding server device and said replication server device comprises at least one of the following items of information relating to the ability of said replication server device to fulfill the data server function: a mean duration of connection to said telecommunications network of said replication server device, a type of connection to said telecommunications network of said replication server device, and whether or not a storage space in said replication server device is available in order to store therein said replica of the digital file.

11. The method according to claim 1, wherein said client device is a peer of the sub-network and said predetermined information further comprises at least one item of information relating to the ability of the client device to operate as a server to supply data.

12. The method according to claim 11, wherein said predetermined information relating to said holding server device, said replication server device and said client device comprises at least one of the following items of information relating to the ability of said client device to, in its turn, fulfill the data server function: a type of said client device, a type of connection to said telecommunications network of said client device, a mean duration of connection to said telecommunications network of said client device, and whether or not a storage space in said client device is available in order to store therein said replica of the digital file.

13. The method according to claim 1, wherein the predetermined information is related to said requested digital file.

14. The method according to claim 13, wherein said predetermined information relating to said requested digital file comprises at least one of the following items of information: a number of subsequent potential requests for said requested digital file, a sharing date for said requested digital file and/or a sharing date for a collection to which said requested digital file belong, a number of users that may want access to said requested digital file, and a size of said requested digital file.

15. The method according to claim 1, wherein the peers of the sub-network comprises a digital data cache split into at least one maximum storage space for storing replica of digital files held by holding server devices and at least one storage space for storing data when operating as a simple peer-to-peer client in the sub-network.

16. A computer-readable storage medium, storing a computer-readable program that executes the method according to claim 1.

17. A peer-to-peer holding server device for distributing a digital file of digital data to a requesting client device in a telecommunications network, the network comprising said peer-to-peer holding server device which holds the digital file and operates as a peer of a peer-to-peer sub-network of said network, at least one replication server device operating as either a peer-to-peer replication server device of the sub-network or as a storage server in the telecommunications network, and a client device requesting the digital file, the holding server device comprising:

registering means for registering the replication server devices in said peer-to-peer holding server device;

reception means for receiving a request from said client device to obtain the digital file;

obtaining means for obtaining predetermined information relating to abilities of the peer-to-peer holding server device and each of the registered replication server devices to operate as servers to supply data;

deciding means for, upon receiving the request by said reception means, deciding between a direct supply solution where the peer-to-peer holding server device directly supplies the client device with the digital file, and an indirect supply solution where the digital file is supplied by one of the registered replication server devices, the decision being based on the obtained predetermined information;

selecting means for, in a case where the indirect supply solution is decided by the deciding means, selecting one of the registered replication server devices among said registered replication server devices, based on the obtained predetermined information, wherein the selecting of the registered replication server comprises determining whether any of the registered replication server devices already stores said digital file, and in a case where it is determined that none of the registered replication server devices already stores said digital file:
  a) selecting one of the registered replication server devices that operates as a storage server in the telecommunications network; and uploading from the peer-to-peer holding server device a replica of the digital file to said selected replication server device before redirecting the client device; or
  b) selecting a replication server device operating as a peer-to-peer replication server device of the sub-network; and creating by the peer-to-peer holding server device a replica of the digital file in said selected peer-to-peer replication server device after redirecting the client device;
redirecting means for redirecting the requesting client device to the selected replication server device for obtaining a replica of the digital file; and
supplying means for, in a case where the direct supply solution is decided by the deciding means, supplying the requesting client device with said digital file from the peer-to-peer holding server device as a peer of the peer-to-peer sub-network.

18. A method of distributing a digital file of digital data to a requesting client device in a telecommunications network, the network comprising a peer-to-peer holding server device holding said digital file and operating as a peer of a peer-to-peer sub-network of said network, at least one replication server device operating as either a peer-to-peer replication server device of the sub-network or as a storage server in the telecommunications network, and a client device, the method comprising the following steps implemented by the peer-to-peer holding server device:
  preliminarily registering the replication server devices with said peer-to-peer holding server device;
  receiving a request from said client device to obtain the digital file;
  obtaining predetermined information relating to abilities of the peer-to-peer holding server device and each of the registered replication server devices to operate as servers to supply data;
  upon reception of said request, deciding between a direct supply solution where the peer-to-peer holding server device directly supplies the client device with the digital file, and an indirect supply solution where the digital file is supplied by one of the registered replication server devices, the decision being made by the peer-to-peer holding server device based on the obtained predetermined information;
  in a case where the indirect supply solution is decided:
    selecting one of registered replication server devices among said registered replication server devices, based on the obtained predetermined information,
    wherein the selecting of the registered replication server comprises determining whether any of the registered replication server devices already stores said digital file, and in a case where it is determined that none of the registered replication server devices already stores said digital file, the method further comprises:
    a) selecting one of the registered replication server devices that operates as a storage server in the telecommunications network; and uploading from the peer-to-peer holding server device a replica of the digital file to said selected replication server device before redirecting the client device; or
    b) selecting a replication server device operating as a peer-to-peer replication server device of the sub-network; and creating by the peer-to-peer holding server device a replica of the digital file in said selected peer-to-peer replication server device after redirecting the client device; and
  redirecting the requesting client device to the selected replication server device for obtaining a replica of the digital file; and
  in a case where the direct supply solution is decided, supplying the requesting client device with said digital file from the peer-to-peer holding server device as a peer of the peer-to-peer sub-network,
  wherein the telecommunications network comprises at least one replication server device operating as the peer-to-peer replication server device of said sub-network and at least one replication server device operating as the storage server in the network.

19. A method of distributing a digital file of digital data to a requesting client device in a telecommunications network, the network comprising a peer-to-peer holding server device holding said digital file and operating as a peer of a peer-to-peer sub-network of said network, at least one replication server device operating as either a peer-to-peer replication server device of the sub-network or as a storage server in the telecommunications network, and a client device, the method comprising the following steps implemented by the peer-to-peer holding server device:
  preliminarily registering the replication server devices with said peer-to-peer holding server device;
  receiving a request from said client device to obtain the digital file;
  obtaining predetermined information relating to abilities of the peer-to-peer holding server device and each of the registered replication server devices to operate as servers to supply data;
  upon reception of said request, deciding between a direct supply solution where the peer-to-peer holding server device directly supplies the client device with the digital file, and an indirect supply solution where the digital file is supplied by one of the registered replication server devices, the decision being made by the peer-to-peer holding server device based on the obtained predetermined information;
  in a case where the indirect supply solution is decided:
    selecting one of the registered replication server devices among said registered replication server devices, based on the obtained predetermined information,
    wherein the selecting of the registered replication server comprises determining whether any of the registered replication server devices already stores said digital file, and in a case where it is determined that none of the registered replication server devices already stores said digital file, the method further comprises:
    a) selecting one of the registered replication server devices that operates as a storage server in the telecommunications network; and uploading from the peer-to-peer holding server device a replica of the digital file to said selected replication server device before redirecting the client device; or
    b) selecting a replication server device operating as a peer-to-peer replication server device of the sub-network; and creating by the peer-to-peer holding server device a replica of the digital file in said selected peer-to-peer replication server device after redirecting the client device; and redirecting the requesting client device to the selected replication server device for obtaining a replica of the digital file; and in a case where the direct supply solution is decided, supplying the requesting client device with said digital file from the peer-to-peer holding server device as a peer of the peer-to-peer network, wherein the registering comprises specifying, for each of the replication server devices, whether the replication server device is a peer-to-peer server agreeing to operate as a proxy server device.

* * * * *